US011979800B2

(12) United States Patent
Schadow et al.

(10) Patent No.: US 11,979,800 B2
(45) Date of Patent: May 7, 2024

(54) DEVICE, PARTICULARLY A HAND-HELD POWER TOOL MANAGEMENT DEVICE AND METHOD FOR MONITORING AND/OR MANAGING A PLURALITY OF OBJECTS

(71) Applicant: Robert Bosch GmbH, Stuttgart (DE)

(72) Inventors: Joachim Schadow, Stuttgart (DE); Florian Esenwein, Leinfelden-Echterdingen (DE); Joern Stock, Tuntenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 461 days.

(21) Appl. No.: 17/274,750

(22) PCT Filed: Feb. 4, 2019

(86) PCT No.: PCT/EP2019/052599
§ 371 (c)(1),
(2) Date: Mar. 9, 2021

(87) PCT Pub. No.: WO2019/166185
PCT Pub. Date: Sep. 6, 2019

(65) Prior Publication Data
US 2022/0053307 A1     Feb. 17, 2022

(30) Foreign Application Priority Data

Mar. 2, 2018    (DE) .................. 10 2018 203 179.7

(51) Int. Cl.
*H04W 4/38*      (2018.01)
*H04W 4/02*      (2018.01)

(52) U.S. Cl.
CPC ............. *H04W 4/38* (2018.02); *H04W 4/025* (2013.01)

(58) Field of Classification Search
CPC ......... H04W 4/38; H04W 4/025; H04W 4/02; H04W 8/005; H04W 92/16; H04W 91/18;
(Continued)

(56) References Cited

U.S. PATENT DOCUMENTS 7,886,839 B2 * 2/2011 Frauhammer et al. .... 173/162.2
7,909,680 B2 * 3/2011 Boeck et al. ................. 451/344
(Continued)

FOREIGN PATENT DOCUMENTS

DE    10 2007 035 095 A1    1/2009
DE    10 2014 225 332 A1    6/2016
(Continued)

OTHER PUBLICATIONS

International Search Report corresponding to PCT Application No. PCT/EP2019/052599, dated Mar. 28, 2019 (German and English language document) (8 pages).

*Primary Examiner* — Meless N Zewdu
(74) *Attorney, Agent, or Firm* — Maginot, Moore & Beck LLP

(57) ABSTRACT

A device, particularly a hand-held power tool management device, for monitoring and/or managing a plurality of objects, particularly hand-held power tools, includes a communication unit configured to communicate with the objects and a computing unit configured to process electronic data received by the communication unit. The computing unit is configured to output, as a function of swarm information from a swarm that comprises at least some of the objects, commands to at least one of the objects of the swarm and/or information to at least one operator, particularly at least one of the objects of the swarm.

19 Claims, 4 Drawing Sheets

(58) Field of Classification Search
CPC ..... H04W 92/08; H04W 88/00; H04W 88/02;
H04W 28/0842; H04W 28/0875; H04W
12/50; H04W 4/029; H04W 4/026; H04W
88/18; H04W 92/18; G06Q 10/20; G06Q
10/0631; G06Q 50/28; G06Q 10/06;
G06Q 10/00; G06Q 20/30; G06Q 20/321;
G06Q 20/322; G06Q 50/22; G06Q 20/32;
G06N 3/08; G06N 3/12; G05B
2219/40434; G05B 2219/39153; G05B
2219/39146; G05B 19/4065; G05B
19/40938; Y10T 29/4594; Y10T 70/5022;
Y10T 82/16622; Y10T 82/16639
See application file for complete search history.

(56) References Cited

U.S. PATENT DOCUMENTS

| | | | | |
|---|---|---|---|---|
| 8,082,634 | B2* | 12/2011 | Frank et al. | 16/436 |
| 8,205,683 | B2* | 6/2012 | Schadow et al. | 173/162.2 |
| 8,221,197 | B2* | 7/2012 | Boedk et al. | 451/344 |
| 9,449,229 | B1* | 9/2016 | Laska et al. | G06K 9/00718 |
| 9,645,558 | B2* | 5/2017 | Shokooh et al. | G05B 13/04 |
| 2006/0155582 | A1* | 7/2006 | Brown | 705/3 |
| 2008/0132185 | A1* | 5/2008 | Elliot et al. | 455/115.4 |
| 2009/0099768 | A1* | 4/2009 | Bauer et al. | 701/206 |
| 2010/0268409 | A1 | 10/2010 | Vian et al. | |
| 2011/0205022 | A1* | 8/2011 | Cavallaro et al. | 340/8.1 |
| 2014/0025834 | A1* | 1/2014 | Mergener | H04L 69/03 |
| 2014/0184397 | A1* | 7/2014 | Volpert | G05B 19/05 |
| 2015/0063159 | A1 | 3/2015 | Bonawitz et al. | |
| 2015/0109142 | A1* | 4/2015 | Mejegard et al. | H04Q 9/00 |
| 2015/0283694 | A1* | 10/2015 | Goto et al. | B25H 3/02 |
| 2016/0088482 | A1* | 3/2016 | Zeiler et al. | H04W 12/12 |
| 2016/0153806 | A1 | 6/2016 | Ciasulli et al. | |
| 2016/0364687 | A1* | 12/2016 | Matson et al. | G06Q 10/087 |
| 2016/0378585 | A1 | 12/2016 | McElhinney et al. | |
| 2019/0069379 | A1* | 2/2019 | Kastee et al. | H05B 37/0272 |

FOREIGN PATENT DOCUMENTS

| | | | | |
|---|---|---|---|---|
| DE | 102014225332 A1 * | 6/2016 | | H04W 4/80 |
| DE | 10 2015 219 933 A1 | 11/2016 | | |
| DE | 10 2017 205 344 A1 | 12/2017 | | |
| KR | 101708547 B1 * | 2/2017 | | G06K 9/46 |
| WO | 2009/142933 A2 | 11/2009 | | |
| WO | 2016/177481 A1 | 11/2016 | | |

\* cited by examiner

DEVICE, PARTICULARLY A HAND-HELD POWER TOOL MANAGEMENT DEVICE AND METHOD FOR MONITORING AND/OR MANAGING A PLURALITY OF OBJECTS This application is a 35 U.S.C. § 371 National Stage Application of PCT/EP2019/052599, filed on Feb. 4, 2019, which claims the benefit of priority to Serial No. DE 10 2018 203 179.7, filed on Mar. 2, 2018 in Germany, the disclosures of which are incorporated herein by reference in their entirety.

BACKGROUND

A device for monitoring and/or managing a multiplicity of objects has already been proposed, having a communication unit for communicating with the objects and having a computing unit for processing electronic data received by means of the communication unit.

SUMMARY

The disclosure is based on a device, particularly a hand-held power tool management device, for monitoring and/or managing a multiplicity of objects, in particular hand-held power tools, having a communication unit for communicating with the objects and having a computing unit for processing electronic data received by means of the communication unit.

It is proposed that the computing unit, depending on swarm information of a swarm which comprises at least some of the objects, outputs commands to at least one of the objects of the swarm and/or information to at least one operator, particularly of at least one of the objects of the swarm.

By means of the design of the device according to the disclosure, a swarm intelligence can advantageously be used to monitor and/or manage a multiplicity of objects, in particular hand-held power tools. In particular, an organization of the objects can thereby be improved and/or simplified, for example in that charging procedures, operating modes and/or compositions of tool groups can be automated and/or optimized for specific tasks. Furthermore, work simplification and/or work support of an operator of at least one of the objects can advantageously be enabled, particularly by means of the information output to an operator, in particular in that support can be provided in equipping a set of objects, particularly depending on energy requirements and/or tool requirements of a task and/or work step. For this purpose, for example, a possible task and/or a possible field of application of the set could be recognized by means of swarm intelligence on the basis of a recognized partial composition of a set of objects and objects possibly still missing and/or possibly completing the partial composition could then be indicated, in particular visually and audibly, to the operator. The device could advantageously recognize, for example, that an operator plans to carry out demolition work, since he is taking a demolition hammer and a percussion drill with corresponding attachments to a common location, for example an automobile, whereupon the device displays the information to the operator that he should also pack, for example, a helmet, ear protection or a power saw. It is furthermore conceivable, for example, that the device registers work steps of objects, in particular hand-held tools, of a swarm and, on the basis of preceding work steps, in particular by means of swarm information, independently recognizes which object(s), in particular which hand-held tool(s) will next be used in which operating mode(s), and outputs corresponding commands for an adjustment of a tool default setting. Following a use of a concrete saw, for example, a default setting of a percussion function of a percussion drill could be automatically implemented for processing concrete surfaces.

The communication unit is designed, in particular, as a wireless communication unit. The communication unit comprises, in particular, at least one communication module which is provided, in particular, to transmit and/or receive data. In particular, at least one communication module is assigned at least to each of the objects of the swarm and/or to the computing unit. In particular, the communication module of the computing unit forms a central communication module. In particular, the, in particular central, communication module of the communication unit is provided to centrally manage and/or control a communication with and/or between the objects of the swarm. The communication module is provided, in particular, to communicate by means of WLAN, Bluetooth, WiMax, NFC, RFID, ZigBee, Wibree, ANT, Z-Wave, Enocean, UMTS, LTE and/or a comparable transmission standard for radio data communication. Alternatively or additionally, the communication module could comprise an infrared interface. It is conceivable, in particular, that the communication module enables communication by means of a plurality of transmission standards. The objects may, in particular, be hand-held power tools, accessories for hand-held power tools, further tools, in particular without an electrical drive also, and/or protective equipment for an operator. In particular, at least one object of the objects of the swarm is designed as a hand-held power tool. The term "provided" is intended to be understood to mean, in particular, specially programmed, designed and/or equipped. The statement that an object is provided for a specific function is intended to be understood to mean, in particular, that the object performs or executes this specific function in at least one application state and/or operating mode. The term "swarm information" is intended to be understood at least to mean, in particular, information and/or a dataset which has been obtained from an overview and/or processing of a plurality of individual data of individual objects, in particular sensors assigned to individual objects, preferably by the computing unit. The term "swarm" is intended to be understood to mean, in particular, that a group of objects are in a reciprocal relationship with one another or form an interrelated association. The term "computing unit" is intended to be understood to mean, in particular, a unit with an information input, an information processing and an information output. The computing unit advantageously has at least one processor, a memory, input and output means, further electrical components, an operating program, adjustment routines, control routines and/or calculation routines. It is conceivable that the computing unit is equipped with intelligent, preferably self-learning, algorithms for calculating the swarm information. A constant improvement of the commands and/or output information of the computing unit can thereby advantageously be achieved. The term "command" is intended to be understood to mean, in particular a handling instruction which is preferably provided to effect at least one status change of the at least one object on reception by the communication module of an object. In particular, a command can be assigned to a single command recipient, in particular an object, or to a plurality of command recipients which can interpret the command, particularly in an identical or different manner. Information can be output, in particular, visually, for example via a color signal and/or a display on a screen, audibly and/or via a movement, for example a vibration.

It is further proposed that the computing unit has a swarm-forming module which is provided to assign objects to the swarm on the basis of the received electronic data, particularly depending on the swarm information, and/or to remove objects from the swarm. A dynamic grouping can thereby advantageously be effected which can, in particular, be effected automatically. User-friendliness can furthermore advantageously be increased. The swarm-forming module is designed, in particular, as at least partially integral with the computing unit or forms, in particular, a computing device separate from the computing unit, in particular, having a separate processor unit and/or memory unit. The data used by the swarm-forming module can comprise, in particular, at least position data of an object, movement data of an object, object-specific data, for example type data of a hand-held power tool and/or user setting data of an object, a state of charge of an object and/or sensor data of a sensor assigned to an object. It is conceivable, in particular, that, during an assignment procedure, an assignment to a swarm and/or, during a removal procedure, a removal from a swarm is/are recognizably confirmed for an operator, for example by means of an audible or visual signal and/or a signal perceivable in a tactile manner by the user. The swarm-forming module is designed, in particular, as programmable, preferably retrospectively programmable and/or reprogrammable. Boundary conditions for an association with a swarm can thereby advantageously be definable. It is conceivable that the swarm-forming module assigns the at least one object to more than one swarm and/or that the swarm-forming module assigns the at least one object to a subset of a plurality of swarms which, in particular, satisfy specific, predefined boundary conditions. In particular, a plurality of swarms can exist, in particular spatially overlapping one another, and/or be managed simultaneously by the computing unit. The computing unit is provided, in particular, to assign commands to a single swarm and/or to a plurality of swarms. It is conceivable, in particular, that an assignment and/or removal of an object to/from a swarm requires a user confirmation. For this purpose, a confirmation prompt, in particular, can be communicated to a user by the swarm-forming module and/or the computing unit, for example via a visual and audible signal and/or by means of a message which, for example, could be displayed on a user terminal and/or a smartphone. In particular, the swarm-forming module is designed as self-learning. A self-learning swarm-forming module can infer on the basis of preceding confirmations and/or rejections of specific objects whether a newly appearing object should or should not be assigned to a swarm. On the basis of usage statistics of objects of a swarm, a self-learning swarm-forming module can furthermore assign additional objects to this swarm and/or remove objects from the swarm.

It is further proposed that at least one of the commands output by the computing unit is provided to activate and/or block a single function of at least one of the objects, in particular the hand-held power tool and/or a sensor assigned to the hand-held power tool. A swarm intelligence can thereby advantageously be used to monitor and/or manage a multiplicity of objects, in particular hand-held power tools. A high degree of user-friendliness can furthermore advantageously be achieved, for example in that default settings of an object can be adjusted even before it is used for a specific task. A high level of user safety can furthermore advantageously be achieved in that, for example, specific operating modes are blocked by the computing unit in unsafe situations. Use of a noise-emitting object of the swarm could, for example, be enabled only if all objects of a swarm designed as ear protection and located within a specific radius of the noise-emitting object provide feedback that they are in position. A "single function" comprises, in particular, at least one activation function of an object, a deactivation function of an object, a wake-up function of an object, an idle function of an object, an operating mode of an object, a charging function of an object, a function of a sensor of an object, for example an, in particular, temporary, activation of a sensor function and/or a readout of a sensor value.

It is furthermore proposed that the computing unit has an energy-monitoring module which is provided to modify and/or block at least one of the commands, in particular for controlling and/or querying at least one single function of at least one of the objects, in particular the hand-held power tool and/or a sensor assigned to the hand-held power tool, depending on an energy state of the swarm and/or an energy state of at least one object of the swarm prior to an output by the computing unit. A swarm intelligence can thereby advantageously be used for energy-optimized monitoring and/or for managing a multiplicity of objects, particularly hand-held power tools. An energy consumption and/or energy utilization of an energy available in total to the objects of the swarm can thereby advantageously be improved. A total usage period of the objects of the swarm, particularly in the case of a limited energy supply, can furthermore advantageously be optimized as a result. The energy-monitoring module is designed, in particular, as at least partially integral with the computing unit or forms, in particular, a computing device separate from the computing unit, in particular having a separate processor unit and/or memory unit. The energy-monitoring module is provided, in particular, to collect and process data relating to energy states of objects and/or sensors assigned to objects. The term "energy state" is intended to be understood to mean, in particular, a state of charge of an energy storage device, in particular a battery, which supplies the object and/or the sensor with electrical energy. A query of the energy-monitoring module is preferably performed before each transmission of the command by means of the central communication module of the computing unit. The statement that the energy-monitoring module "modifies" a command is intended to be understood to mean, in particular, that at least one command parameter of the command is modified by the energy-monitoring module. In particular, a command can be modified in such a way that a duration of a control of the object and/or the sensor caused by the command is modified, for example in that a sensor and/or a state of an object is read out and/or checked intermittently only, and/or that a type of a control of the object and/or the sensor caused by the command is modified, for example in that an energy-saving mode and/or an operation with reduced energy consumption of a specific function of the object and/or the sensor is controlled. A time interval, in particular, between consecutive commands addressed to a specific object and/or sensor could further be modified depending on the energy state. A readout interval, for example, of sensors with a low state of charge could be increased in order to advantageously extend a service life of the sensors concerned. Furthermore, if a plurality of objects and/or sensors with comparable capabilities are present, a control, by means of a command, of the computing unit of the objects and/or sensors which have the highest state of charge and/or whose energy storage devices, in particular batteries, are designed as rechargeable could be prioritized by means of the energy-monitoring module. In particular, the communication modules of the objects and/or the sensors assigned to the objects are intended to transmit their respective energy state at least periodically, preferably with each transmission of data to the central communication unit of the computing unit, for an evaluation by means of the energy-monitoring module.

It is further proposed that the computing unit has a swarm-checking module which is provided to check the swarm for completeness. A high degree of user-friendliness can thereby advantageously be achieved, particularly in that a probability of forgetting a required object can be reduced. Security against theft and/or loss of an object belonging to a swarm can furthermore advantageously be increased. The swarm-checking module is designed, in particular, as at least partially integral with the computing unit or forms, in particular, a computing device separate from the computing unit, in particular having a separate processor unit and/or memory unit. The computing unit is provided, in particular, to perform, at least periodically, a comparison of a current inventory of a swarm with at least one reference inventory stored in the computing unit. The current inventory is formed here, in particular, from the responses to a current query sent to all objects of the swarm. The reference inventory is formed, in particular, from a preceding response of all objects of the swarm, in particular taking into account possible objects added and/or removed in the interim period. Alternatively, the reference inventory can also be formed from a reference inventory list stored in the memory unit of the computing unit which defines a swarm. It can thereby advantageously be ensured that specific predefined sets of objects which form a swarm are completely present and ready for use. The reference inventory list contains, for example, a provided content of a workman vehicle. It is furthermore conceivable that the computing unit is provided to output a warning message if an object is missing. A checking of the swarm is performed, in particular, by means of the swarm-checking module taking into account an energy state of the objects. Objects whose state of charge could be too low for a transmission in a following query are deleted from the reference inventory and/or the reference inventory list. A checking of the swarm and/or a notification of the operator by means of the warning message is/are preferably performed independently from a laptop, smartphone and/or tablet.

Is further proposed that the swarm, in particular the objects of the swarm, have a multiplicity of sensors, wherein the computing unit is provided to calibrate a sensor of the swarm and/or to output a calibration instruction to an operator of an object belonging to the swarm on the basis of the swarm information, particularly on the basis of sensor data of at least some of the sensors of the swarm. A high precision and reliability of objects and/or sensors belonging to the swarm can thereby advantageously be achieved. A calibration free from additional calibration devices and/or independent from an operator workload can furthermore advantageously be enabled. The sensors are designed, in particular, as environment sensors, for example temperature sensors, humidity sensors, position sensors, orientation sensors, light sensors and/or noise sensors, and/or as operating state sensors, for example vibration sensors, acceleration sensors, power sensors, energy consumption sensors, state of charge sensors and/or operator contact sensors. The sensors can further be provided, in particular, to read out electronic and/or mechanical settings of an object and/or to measure a time duration. In particular, a memory unit at least for storing at least sensor data and/or at least changes in sensor data is assigned to a sensor. A calibration instruction can, in particular, be made accessible to an operator directly as a display on a display unit of the computing unit, can be sent to the operator via a short message and/or can be communicated by means of a different signal, for example by means of an illumination of a colored light on the object and/or sensor to be calibrated. It is furthermore conceivable that the computing unit has a discrimination module which is provided to recognize further objects and/or sensors suitable for a calibration of an object and/or sensor. For this purpose, the discrimination module preferably recognizes, in particular independently and/or in a self-learning manner, objects and/or sensors which have deviating values unsuitable for a calibration. Such unsuitable values can occur, for example, through a localization of sensors and/or objects in different environments, for example inside and outside an enclosed space.

It is furthermore proposed that the computing unit, in particular a computing capacity of the computing unit, is extended, at least in time segments, in particular at least for a time period of an existence of the swarm, by a computing module which is assigned to at least one object of the swarm, in particular by at least one computing capacity of a computing module of at least one object of the swarm, preferably by at least a plurality of computing modules and/or by computing capacities of a plurality of computing modules of at least a plurality of objects of the swarm. A high effectiveness in terms of a utilization of a total computing capacity of a swarm can thereby advantageously be achieved. A dynamic assignment of computing power can thereby advantageously be enabled, for example by allocating calculation tasks to computing modules of objects which have an energy storage device with a good state of charge and/or whose use is not currently intended. Calculation tasks can furthermore advantageously be distributed dynamically among a plurality of processors, whereby a calculation speed can advantageously be increased. The statement that the computing unit is "extended" by a computing module of an object is intended to be understood to mean, in particular, that, as well as a central computing module, the computing unit additionally has further computing modules assigned to objects, and that the central computing module and the further computing modules are networked to form a wireless computer network, in particular a cloud. It is conceivable, in particular, that the computing unit, in particular a computing capacity of the computing unit, is extendable, in particular by means of an addition of new objects, for example new hand-held power tools, new sensors, in particular with new sensor technology, and/or new computing modules, in particular with increased computing capacity, to a swarm. As a result, new functions can advantageously be added to the computing unit and/or existing functions can be improved, in particular speeded up.

If a computing power distribution, in particular of an available computing power, among computing modules of the, in particular extended, computing unit is controlled depending on the swarm information, an optimal utilization of a computing capacity present in the swarm can advantageously be achieved. In particular, the swarm information can comprise at least an energy state of the swarm, a charging energy distribution within the swarm, an activity distribution within the swarm, information relating to the usage state of individual objects of the swarm and/or information relating to the computing power of individual computing modules of objects and/or sensors within the swarm. In particular, the computing power distribution is controlled in such a way that the available computing power is distributed among as many different computing modules as possible. In particular, the computing power distribution is controlled in such a way that the total available computing power produces the lowest possible energy consumption, in particular of energy stored in energy storage devices, preferably batteries, for which purpose, in particular, computing modules whose associated objects are located in a charging station and/or are connected directly to a power network are given preference in a distribution of the available computing power.

It is furthermore proposed that the computing unit has at least one maintenance module which is provided to check at least one service state of at least one computing module of the swarm and/or at least one object of the swarm, and to initiate a maintenance step depending on the service state, in particular to transmit at least one software update to the computing module and/or to indicate a maintenance requirement to an operator. An effective maintenance of the objects of the swarm can thereby advantageously be enabled, whereby downtimes of the swarm and/or of parts of the swarm can advantageously be reduced. It can furthermore advantageously be ensured that objects forming a swarm are optimally matched with one another, in particular in that they are compatible with one another and have optimized software versions. It is furthermore conceivable that maintenance steps can thereby advantageously be synchronized with one another. Maintenance steps, for example, can be carried out on a plurality of objects simultaneously and/or in a timely manner in relation to one another, as a result of which downtimes can advantageously be minimized. The maintenance module is, in particular, designed as at least partially integral with the computing unit or, in particular, forms a computing device separate from the computing unit, in particular having a separate processor unit and/or memory unit. A "service state" is intended to be understood to mean, in particular, an up-to-date state of firmware and/or a time interval until a next manual maintenance and/or a pending exchange of a wearing part. A "maintenance step" is intended to be understood to mean, in particular, at least one software update, in particular firmware update, at least one manual maintenance and/or at least one exchange of a wearing part. The computing module preferably knows and/or manages all service states of the objects of the swarm.

It is additionally proposed that the swarm, in particular the objects of the swarm, have a multiplicity of sensors, wherein a sensor activation or a sensor usage is controlled depending on the swarm information, in particular by means of commands of the computing unit. A particularly complete picture of the swarm, in particular of the state of the swarm, can be obtained by means of a multiplicity of sensors, whereby a swarm intelligence can advantageously be further increased. A high effectiveness can be achieved through a swarm-dependent control of the sensor usage. An unnecessary multiple measurement, for example, of one data value by a plurality of similar, closely adjacent sensors can be avoided. Furthermore, if a large number of sensors are present at a common location, an intelligent selection of particularly suitable sensors from the multiplicity of sensors can be made, for example on the basis of measurement precision, energy consumption and/or the energy state of a sensor.

It is further proposed that the swarm, in particular the objects of the swarm, have a multiplicity of sensors, wherein the computing unit has a plausibility module which is provided to investigate the plausibility of sensor data of a sensor of the swarm by means of a control and/or a readout of a suitable further sensor of the swarm, in particular through data reconciliation of the sensor data of the sensor and the further sensor depending on the swarm information, in particular the position information and/or location information of sensors. A high measurement reliability and/or measurement accuracy can thereby advantageously be achieved, in particular in that measurement errors can be detected, for example on the basis of differences between the sensor data of two sensors. In particular, the plausibility module is designed as at least partially integral with the computing unit or forms, in particular, a computing device separate from the computing unit, in particular having a separate processor unit and/or memory unit. In particular, the computing unit performs a sequential querying of adjacent sensors, wherein the query is preferably restricted to sensors which have an adequate residual energy and/or a rechargeable energy storage device, and wherein, in particular, the plausibility module, after receiving the sensor data, investigates the plausibility of said data, taking into account their positioning in relation to one another. It is conceivable that a display unit of the computing unit and/or a notification element and/or display element of an object and/or sensor is provided to visually identify sensors and/or objects having implausible data. The notification element and/or the display element is designed, in particular, as a light, in particular an LED light, assigned to an object and/or a sensor.

It is further proposed that the computing unit comprises an event recognition module which is provided to recognize an event which relates to at least a part of the swarm on the basis of the swarm information, in particular on the basis of sensor data from sensors of the swarm, in particular from sensors of objects of the swarm. An automatic event recognition can thereby advantageously be enabled, whereby, in particular, a prompt response to the event becomes possible. In particular, the event recognition module is designed as at least partially integral with the computing unit or forms, in particular, a computing device separate from the computing unit, in particular having a separate processor unit and/or memory unit. The event recognition module is provided, in particular, to analyze a multiplicity of sensor data received by the communication unit and to perform a pattern recognition. Particularly in the case where a known pattern is recognized, the event recognition module is provided to output commands to at least some of the objects and/or sensors of the swarm by means of the computing unit and/or the communication unit. The event recognition module recognizes, for example, that acceleration sensors of the objects of the swarm are registering randomly distributed vibrations. The event recognition module infers therefrom, in particular, that the swarm is located inside a moving vehicle and, by means of the communication unit, transmits commands to the objects, said commands switching said objects to an idle mode. A further example of a pattern recognition would be, in particular, a recognition of a sequence of an activation of individual objects and a specific operating procedure inferred therefrom which increases a probability of a subsequent use of a further object of the swarm which could then be automatically prepared, for example preheated.

If the recognition of the event is based on a movement of at least a part of the swarm, said movement deviating, in particular, from a predefined movement radius and/or a total movement of the swarm, a swarm intelligence can advantageously be used to monitor and/or manage, in particular a location monitoring and/or a location management of a multiplicity of objects, in particular hand-held power tools. The term "movement" is intended to be understood to mean, in particular, a spatial translation, a rotation and or vibration.

If the recognition of the event is based on a temperature distribution at different locations within the swarm, a swarm intelligence can advantageously be used to monitor and/or manage, in particular a multiplicity of objects, in particular hand-held power tools. It can be inferred, for example, by means of a sudden increase and/or decrease in a temperature at the location of at least a part of the swarm, that a door has been opened nearby and an imminent use of at least some of the objects could therefore be about to occur. A temperature change at the location of an object accordingly results, in particular, in the activation of a wake-up function of the object.

It is further proposed that the communication unit has an encryption module which is provided to encrypt and/or decrypt a data communication within the swarm and/or with the computing unit. High security can thereby advantageously be achieved. In particular, an improper manipulation of at least a part of the swarm can be prevented. In particular, the encryption module is designed as at least partially integral with the computing unit or forms, in particular, a computing device separate from the computing unit, in particular having a separate processor unit and/or memory unit. The encryption module is further provided to anonymize operator data of an operator of at least one object of the swarm during a data transmission. A high degree of data protection can thereby advantageously be achieved.

A system is further proposed, comprising a device for monitoring and/or managing a multiplicity of objects, in particular hand-held power tools, as claimed in one of the preceding claims and having a swarm formed by a multiplicity of objects. By means of the design of the system according to the disclosure, a swarm intelligence can advantageously be used to monitor and/or manage a multiplicity of objects, in particular hand-held power tools. In particular, an organization of the objects can thereby be improved and/or simplified, for example in that charging procedures, operating modes and/or compositions of tool groups for specific tasks can be automated and/or optimized. Furthermore, work simplification and/or work support of an operator of at least one of the objects can advantageously be enabled, particularly by means of the information output to an operator.

It is further proposed that the system comprises an access control unit. A swarm intelligence for monitoring and/or managing a multiplicity of objects, in particular hand-held power tools, can thereby advantageously be used. Furthermore, a high degree of user-friendliness can be achieved by activating and preparing objects as soon as the access control unit registers an operator. A camera, for example, monitors a site and/or an area in which the objects of the swarm are stored, wherein, when a person is registered by the camera, the objects of the swarm are switched by means of commands from the computing unit so that they are ready for use. The system having the access control unit is provided, in particular, to provide a fine-tunable authorization structure and/or authorization management which grants and/or refuses an operator access to at least some of the objects of the swarm depending on an access authorization assigned to the operator. The system having the access control unit has, in particular, an access authorization module. In particular, the access authorization module is designed as at least partially integral with the computing unit or forms, in particular, a computing device separate from the computing unit, in particular having a separate processor unit and/or memory unit. The access authorization module is provided to manage the authorization structure and/or the authorization management of the system having the access control unit.

It is further proposed that the access control unit is provided to enable and/or block a function of at least a part of the swarm, in particular for the operator, depending on an access authorization of an operator wishing to gain access to at least a part of the swarm and/or depending on at least one swarm information element. Security can thereby advantageously be increased. In particular, specific objects can be made accessible only to a group of persons who, for example through instruction or through an association with a company, are authorized to operate said object. A theft and/or inadvertent appropriation of an object can thereby advantageously be hindered. If, for example, an object is removed from a swarm without an operator authorized for this purpose being registered by the access control unit, an alarm function, in particular a theft alarm function, can advantageously be triggered. Alternatively or additionally, an alarm function can be triggered, for example, if an object of the swarm is moved and/or activated without an operator authorized for this purpose being registered with the access control unit.

Security can advantageously be further increased if the access control unit comprises at least one camera, in particular having a facial recognition function, and at least one motion detector. In particular, the access authorization module is provided to control and/or regulate the access control unit. The camera and/or the motion detector is provided, in particular, to monitor an entrance area and/or a site, for example a factory premises and/or factory floor. Alternatively or additionally, the access control unit can comprise at least one access control system. The access control system is designed, in particular, as an access portal, as a door, as a revolving door and/or as a separating installation, such as, for example, a turnstile, which preferably has an identification device, for example an ID card reader, a fingerprint scanner or the like.

A method is further proposed for monitoring and/or managing a multiplicity of objects which form at least one swarm, wherein, in one method step, commands are output to at least one of the objects of the swarm and/or information is output to an operator of one of the objects of the swarm depending on the swarm information of the objects of the swarm. By means of the design of the method according to the disclosure, a swarm intelligence can advantageously be used to monitor and/or manage a multiplicity of objects, in particular hand-held power tools. In particular, an organization of the objects can thereby be improved and/or simplified.

The device according to the disclosure, the system according to the disclosure and/or the method according to the disclosure is/are not intended to be restricted here to the application and embodiment described above. In particular, the device according to the disclosure, the system according to the disclosure and/or the method according to the disclosure can have a number differing from a number specified herein of individual elements, components, units and method steps in order to implement a mode of operation described herein. Furthermore, in respect of the value ranges indicated in this disclosure, values lying within the specified limits are also intended to be considered as disclosed and usable in any way.

BRIEF DESCRIPTION OF THE DRAWINGS

Further advantages are set out in the following description of the drawing. One example embodiment of the disclosure is illustrated in the drawing. The drawing, the description and the claims contain numerous features in combination.

The person skilled in the art will appropriately also consider the features individually and combine them into further useful combinations.

In the drawing:

Figure 1:
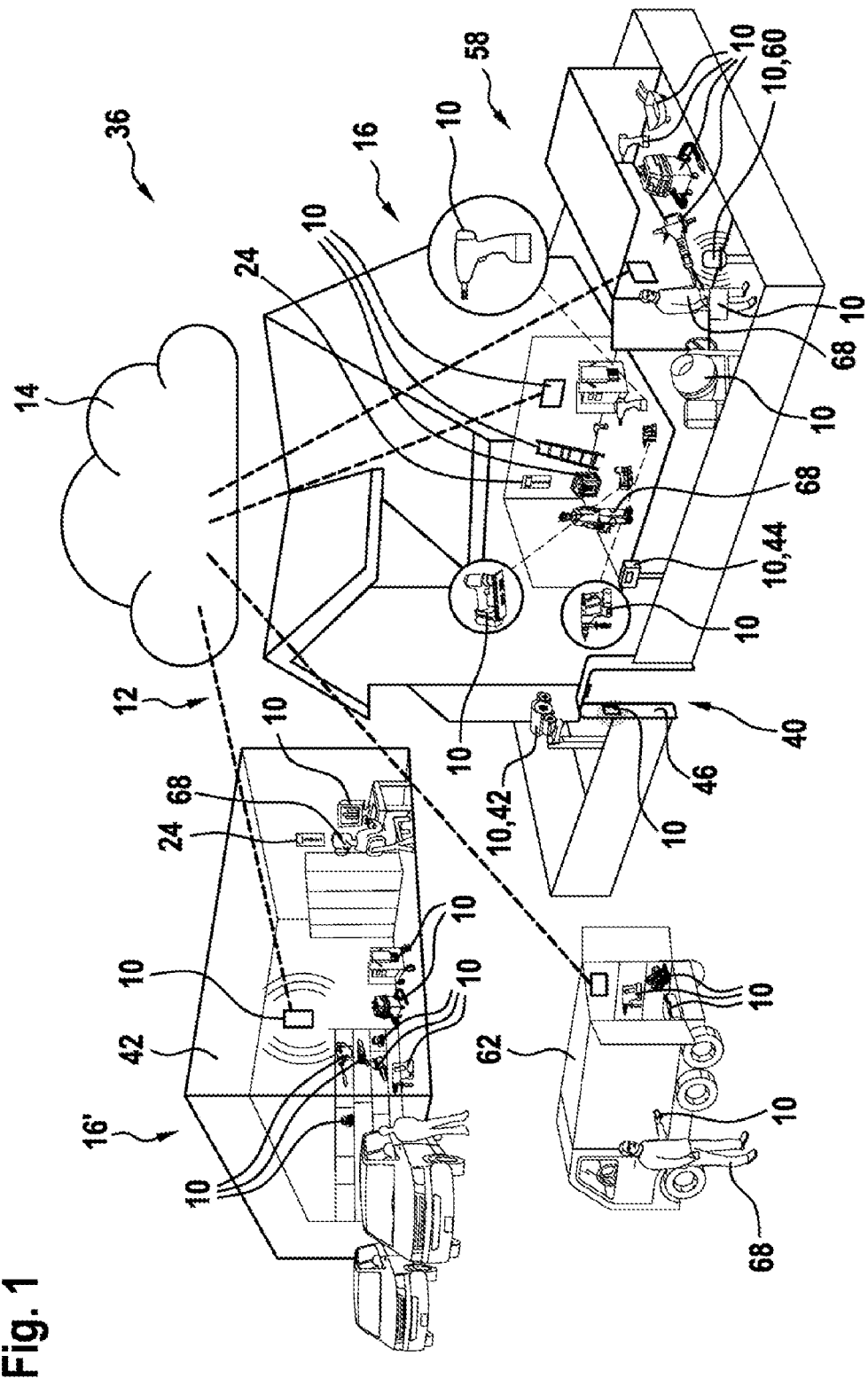
Figure 2:
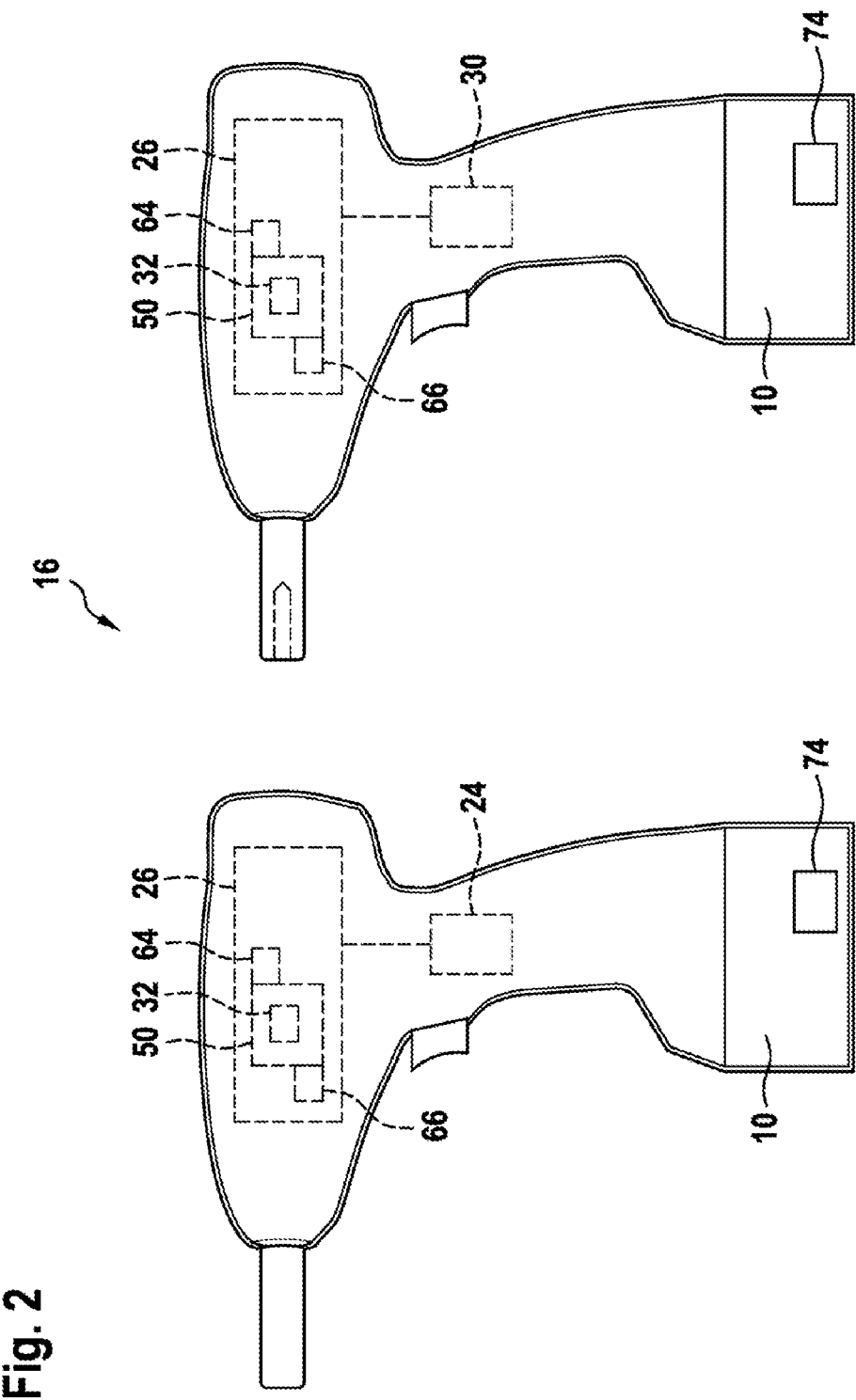
Figure 3:
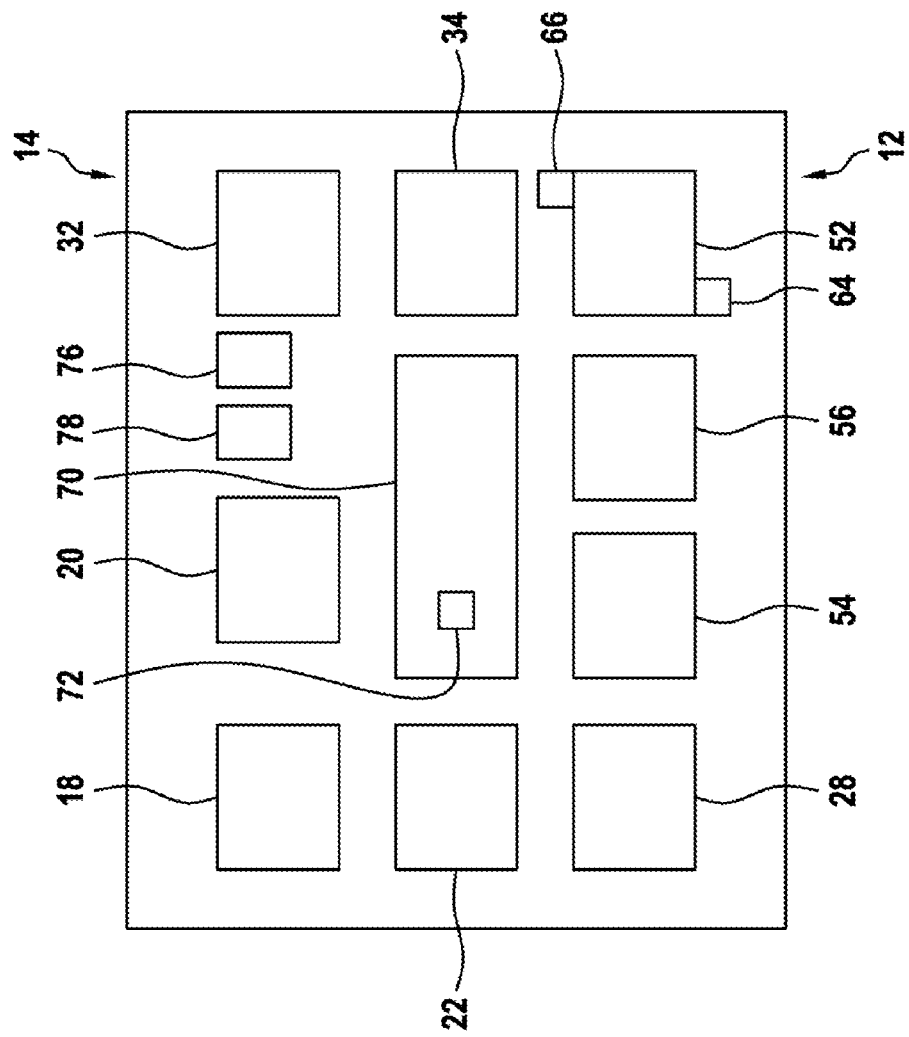
Figure 4:
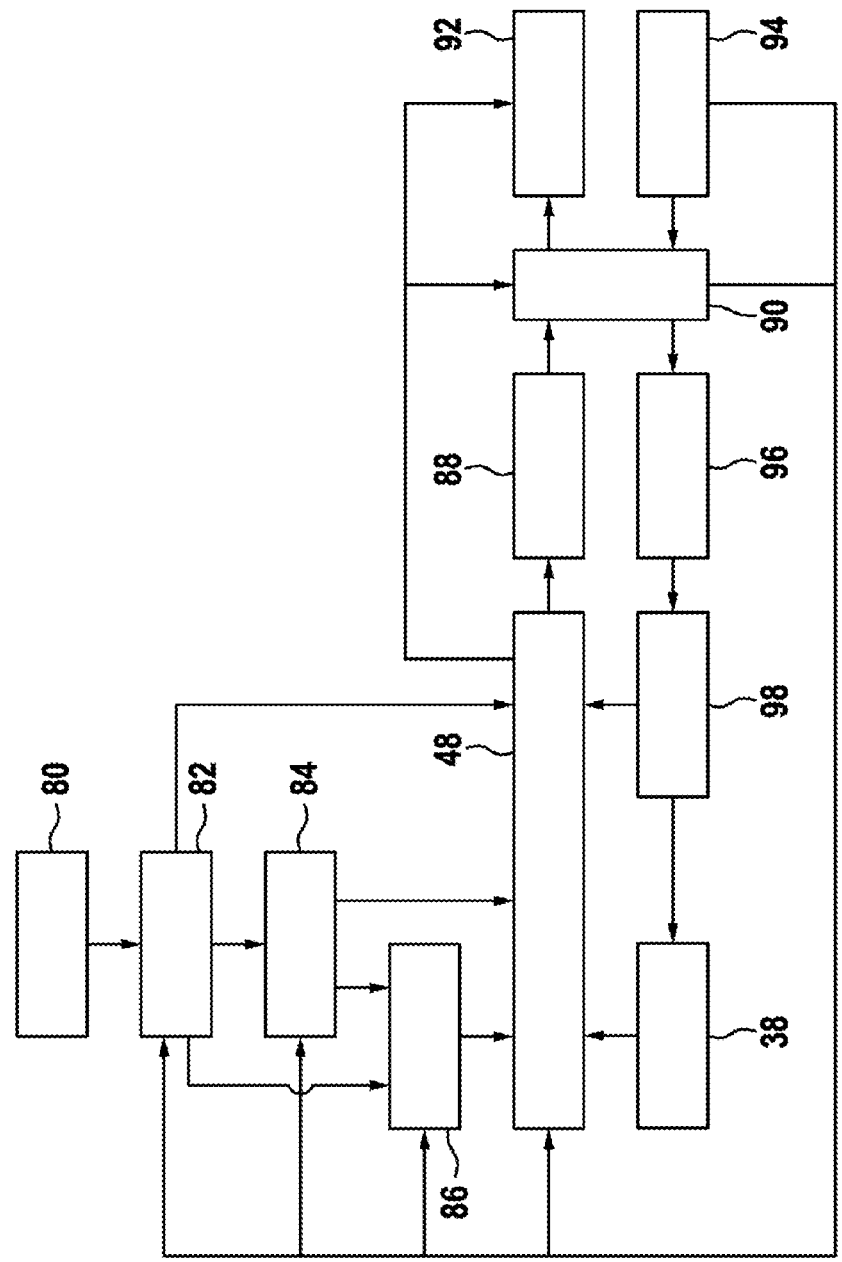

FIG. 1 shows a schematic view of a system according to the disclosure, comprising a device for monitoring and/or managing a multiplicity of objects, FIG. 2 shows a schematic view of two examples of objects of the system, FIG. 3 shows a schematic view of a computing unit of the device for monitoring and/or managing the multiplicity of objects, and FIG. 4 shows a flow diagram of a method for monitoring and/or managing a multiplicity of objects.

DETAILED DESCRIPTION

FIG. 1 shows a schematic view of a system 36. The system has a device. The system 36 has a multiplicity of objects 10. The device is provided to monitor and/or manage the multiplicity of objects 10. Some of the objects 10 form a swarm 16. Some other objects 10 form a further swarm 16'. The swarm 16 and the further swarm 16' have no common objects 10. Alternatively, it is conceivable that at least some of the objects 10 are assigned to more than one swarm 16, 16'. Some of the objects 10 are designed as hand-held power tools. Some of the objects 10 are designed as objects 10 other than hand-held power tools, for example as a concrete mixer, as a cable drum, as an access portal, as a PC, as storage boxes, as a vacuum cleaner and/or as a wheelbarrow.

The system 36 has an access control unit 40. The access control unit 40 is provided to enable a function of a part of the swarm 16, 16' depending on an access authorization of an operator 68 wishing to gain access to at least a part of the swarm 16, 16'. The access control unit 40 is provided to block a function of a part of the swarm 16, 16' depending on an access authorization of an operator 68 wishing to gain access to at least a part of the swarm 16, 16'. The access control unit 40 is provided to enable a function of a part of the swarm 16, 16' depending on the swarm information. The access control unit 40 is provided to block a function of a part of the swarm 16, 16' depending on the swarm information. The access control unit 40 constitutes an object 10.

The access control unit 40 comprises a camera 42. The camera 42 is provided to register persons. The camera 42 is provided to recognize operators 68 of objects 10. The camera 42 has a computing module (not shown). The camera is provided to assign persons by means of facial recognition by means of the computing module. For facial recognition, images of the camera 42 are compared with images stored in a central memory module 72 of the computing module and/or a higher-level computing unit 14 of the device. The camera 42 constitutes an object 10.

The access control unit 40 comprises a motion detector 44. The motion detector 44 is provided to detect movements in a defined area 58. The defined area 58 is formed by an area around the building demarcated by a site fence. Some of the objects 10 of the swarm 16 are located within the area 58. Some of the objects 10 of the swarm 16 are disposed outside the area 58 in a workman vehicle 62. The motion detector 44 constitutes an object 10. The access control unit 40 comprises an access control system 46. The access control system 46 is designed as an access portal which is provided to establish the identity of persons passing through the access portal. The access control system 46 constitutes an object 10.

The system 36 has an alarm signaling device 60. The alarm signaling device 60 is designed as a warning light. The alarm signaling device 60 is provided to output a warning message on detecting an unauthorized access of a person to the area 58 and/or an unauthorized presence of a person in the area 58. The alarm signaling device 60 constitutes an object 10.

The device has a communication unit 12. The communication unit 12 is provided to communicate with the objects 10. The communication unit 12 comprises a multiplicity of communication modules 50. FIG. 2 shows two examples of objects 10. The objects 10 are assigned to the swarm 16. The objects 10 have a display element 74. The display element 74 is provided to indicate an association with the swarm 16, 16'. For this purpose, the display elements 74 of objects 10 of the common swarm 16, 16' can, for example, be illuminated in a common color, or can display a common lettering and/or a common symbol. The swarm 16, 16' has a multiplicity of sensors 24, 30. Some of the sensors 24, 30 are assigned to objects 10. The sensors 24, 30 are provided to sense an operating parameter and/or an environment parameter. Alternatively or additionally, the sensors 24, 30 can be provided to sense a plurality of environment parameters and operating parameters and/or further parameters. A sensor activation is controlled depending on the swarm information. A sensor use is controlled depending on the swarm information.

A communication module 50 is assigned in each case to an object 10. The communication module 50 has a transmitter 64 and a receiver 66. The transmitter 64 is provided to transmit data of the object 10 and/or of the sensor 24, 30. The receiver 66 is provided to receive commands for the object 10 and/or the sensor 24, 30. The communication by means the communication unit is performed wirelessly.

The objects 10 in each case have a computing module 26. The computing module 26 is provided to read out and process sensor data of the sensors 24, 30 and to forward said data for transmission to the communication module 50. The computing module 26 is provided to forward commands received by means of the receiver 66 of the communication module 50 to the object 10 and/or to the sensor 24, 30 and/or to initiate an implementation of the commands.

The device has a computing unit 14. The computing unit 14 forms a cloud. Alternatively, the computing unit 14 can comprise a central data processing system and/or can be formed at least partially by a central data processing system. FIG. 3 shows a part of the computing unit 14 separately. The computing unit 14 is designed as partially integral with the communication unit 12. The computing unit 14 is provided to process electronic data received by means of the communication unit 12. The computing unit 14 is provided to output commands to at least one of the objects 10 of the swarm 16, 16' depending on the swarm information of a swarm 16, 16' comprising objects 10. A command output by the computing unit 14 is provided to activate a single function of one of the objects 10. A further command output by the computing unit 14 is provided to activate a single function of one of the objects 10.

The computing unit 14 is provided to output information to at least one operator 68 of one of the objects 10 of the swarm 16, 16' depending on the swarm information of a swarm 16, 16' comprising objects 10. The computing unit has a central computing module 70. The central computing module 70 is provided to provide computing capacities for the computing unit 14. The central computing module 70 is provided to manage computing capacities of the computing unit 14 and of modules of the computing unit 14. The central computing module 70 has a central memory module 72. The central memory module 72 comprises a physical memory. The central memory module 72 is provided to store data of objects 10, sensors 24, 30 and/or operating programs of the computing unit 14.

The computing unit 14 is extended, at least in time segments, by a computing module 26 of an object 10 of the swarm 16, 16' or by a plurality of computing modules 26 of a plurality of objects 10 of the swarm 16, 16'. The computing capacities of the computing modules 26 and of the central computing module 70 are combined in the case of an extension of the computing unit 14. A computing power distribution of pending calculation tasks of the computing unit 14 is controlled in the case of an extended computing unit 14 among the extended computing modules 26 depending on the swarm information. The computing power distribution of the extended computing unit 14 is dynamically controllable.

The computing unit 14 is provided to calibrate a sensor 24, 30 of the swarm 16, 16' depending on the swarm information. The computing unit 14 has a calibration module 76. The computing unit 14 has a discrimination module 54. In order to calibrate a sensor 24 by means of the calibration module 76 on the basis of the swarm information, the calibration module 76 compares the sensor data of the sensor 24 with sensor data of further sensors 30. By means of the discrimination module 54, the computing unit 14 determines further sensors 30 suitable for calibration. The discrimination module 54 compares a spatial position of the sensors 24, 30 and/or makes use of swarm information for this purpose. The calibration module 76 creates a calibration curve on the basis of the sensor data of the further sensors 30. An automatic calibration and/or adjustment of the output of the sensor 40 is performed by means of the calibration curve. The computing unit 14 is provided to output a calibration instruction to an operator 68 of an object 10 belonging to the swarm 16, 16' on the basis of the swarm information. The calibration instruction is created depending on sensor data of the sensor 24, 30, for example if said data reveal anomalies, and/or depending on a time period that has elapsed since a last calibration. The display unit 74 can advantageously be provided to convey a calibration instruction to the operator 68 by means of a display and/or a light signal. Alternatively, a calibration instruction can be conveyed by means of the communication unit 12 in the form of a message to an operator 68.

The communication unit 12 has a central communication module 52. The computing unit 14 has the central communication module 52. The central communication module 52 is assigned to the central computing module 70. The central communication module 52 is provided to coordinate the communication of the communication unit 12. The central communication module 52 is provided to coordinate the communication with the communication modules 50 of the objects 10. The central communication module 52 has a transmitter 64 and a receiver 66. The central communication module 52 is provided to convey commands of the communication unit 14 to the objects 10. The communication unit 12 has an encryption module 34. The encryption module 34 is provided to encrypt and/or decrypt a data communication within the swarm 16, 16'. An encryption module 34 is assigned to each communication module 50, 52. The communication module 50 is designed as partially integral with the encryption module 34 (cf. FIG. 2 also).

The computing unit 14 has a swarm-forming module 18. The swarm-forming module 18 is provided to assign objects 10 to a swarm 16, 16' on the basis of electronic data received by the central communication module 52. The swarm-forming module 18 is provided to remove objects 10 from the swarm 16, 16' on the basis of electronic data received by the central communication module 52. The swarm-forming module 18 stores a table which comprises the objects 10 of a swarm 16, 16' in the central memory module 72. If an object 10 is added and/or removed, the swarm-forming module 18 manipulates the stored table. An object 10 is added and/or removed in response to a command transmitted to the swarm-forming module 18, for example by means of an external operator specification, or by means of an internal comparison with a further table stored in the central memory module 72 and containing a list of objects 10 intended for a swarm 16, 16'. The encryption module 34 is provided to encrypt and/or decrypt a data communication with the computing unit 14.

The computing unit 14 has an energy-monitoring module 20. The energy-monitoring module 20 is provided to modify and/or block a command output by the computing unit 14 depending on an energy state of the swarm 16, 16' and/or on an energy state of an object 10 of the swarm 16, 16' prior to an output by the computing unit 14. For this purpose, a comparison with energy states of objects 10 stored in the central memory module 72 takes place, in particular prior to an output of a command by the energy-monitoring module 20. If a low energy state of an object 10 is detected, the energy-monitoring module 20 modifies commands to the object 10 with the aim of minimizing an energy consumption caused by the execution of the command. Alternatively, the energy-monitoring module 20 reduces a frequency of a transmission of commands to the object 10, or completely blocks the transmission of commands to the object 10.

The computing unit 14 has a swarm-checking module 22. The swarm-checking module 22 is provided to check the swarm 16, 16' for completeness. To do this, the swarm-checking module compares the objects 10 currently belonging to the swarm 16, 16' with a table of objects 10 stored in the central memory module 72 on the basis of received identifiers of objects 10, wherein the table contains a specification for objects 10 necessarily belonging to the swarm 16, 16'. Alternatively or additionally, the swarm-checking module 22 can be provided to carry out a comparison of a content of a swarm 16, 16' at one time with a content of the same swarm 16, 16' at a preceding time. If the swarm-checking module 22 establishes that an object 10 is missing, the swarm-checking module 22 initiates a notification of an operator 68 and/or an administrator of the device. Alternatively or additionally, if an object 10 is missing, the swarm-checking module 22 can search for suitable objects 10 by means of a signal transmitted via the communication unit 12 and, in the event of corresponding positive feedback, can add missing objects 10 to the swarm 16, 16' by means of the swarm-forming module 18.

The computing module 14 has a maintenance module 78. The maintenance module 78 is provided to check a service state of a computing module 26 of the swarm 16, 16'. The maintenance module 78 is provided to initiate a maintenance step of the computing module 26 if a service state requires it. In the maintenance step, the maintenance module 78 updates firmware installed on the computing module 26. The maintenance module 78 is provided to check a service state of an object 10 of the swarm 16, 16'. The maintenance module 78 is provided to initiate a maintenance step for the object 10 if a service state requires it. In the maintenance step for the object 10, the maintenance module 78 transmits a maintenance request, for example for an exchange of a wearing part, to an operator 68. The maintenance module 78 is provided to synchronize maintenance steps of a plurality of objects 10, sensors 24, 30 and/or computing modules 26.

The computing unit 14 has a plausibility module 28. The plausibility module 28 is provided to investigate the plausibility of sensor data of a sensor 24 of the swarm 16, 16' by means of a control and/or readout of a suitable further sensor 30 of the swarm 16, 16' depending on the swarm information. The plausibility module 28 confirms a plausibility as positive if the sensor data of the sensor 24 and of the further sensor 30 at least substantially match one another. In the event of a significant deviation of the sensor data of the sensor 24 and the further sensor 30 from one another, the plausibility module 28 compares the sensor data of the sensor 24 and of the further sensor 30, if possible, with an additional further sensor (not shown) of an object 10 which is located in close proximity to the sensor 24 and the further sensor 30 and is capable of sensing a matching parameter. In the event of a match of sensor data of two sensors 24, 30 and in the event of a deviation of the sensor data of the third sensor 24, 30, the plausibility module 28 marks the deviating sensor 24, 30 as defective and initiates a notification of an operator 68, a calibration of the deviating sensor 24, 30 by means of the calibration module 76 and/or a maintenance of the deviating sensor 24, 30 by means of the maintenance module 78. In the event of a significant deviation of the sensor data of three sensors 24, 30 from one another, the plausibility module 28 initiates a notification of an operator 68 by means of the communication unit 12.

The computing unit 14 has an event recognition module 32. The event recognition module 32 is provided to recognize an event relating to at least a part of the swarm 16, 16' on the basis of the swarm information. The swarm information consists of collected sensor data of the sensors 24, 30 of the swarm 16, 16'. The event recognition module 32 analyzes the swarm information by means of pattern recognition. To do this, the event recognition module 32 compares patterns in the swarm information with known patterns and initiates a response in the event of a match. Known patterns may, for example, be patterns which are stored in the central memory module and to which the event recognition module 32 has access. Alternatively or additionally, the event recognition module 32 can be provided to recognize patterns independently, wherein the independent pattern recognition can be supported, in particular, by self-learning algorithms. A constant improvement and/or optimization of the pattern recognition and/or of the response of the event recognition module 32 following a recognition of a pattern can thereby be advantageously enabled. The recognition of an event by the event recognition module 32 is based, for example, on a movement of at least a part of the swarm 16, 16' and/or on a temperature distribution at different locations within the swarm 16, 16'.

The computing unit 14 has an access authorization module 56. The access authorization module 56 is provided to regulate an access authorization of an operator 68 to an object 10 of the swarm 16, 16'. The access authorization module 56 compares an identity of an operator 68 with an authorization management stored in the central memory module 72. The authorization management is designed as a table which links each registered operator 68 with specific objects 10 of the swarm 16, 16'.

FIG. 4 shows a flow diagram of a method for monitoring and/or managing a multiplicity of objects 10. In at least one method step 80, a swarm 16, 16' is formed by means of the swarm-forming module 18. For this purpose, objects 10 are grouped and networked through reciprocal communication. In at least one method step 82, the swarm 16, 16' is checked by the swarm-checking module 22. To do this, a current inventory of objects 10 networked within the swarm 16, 16' is compared with a reference inventory of the swarm 16, 16' which is stored in the central memory module 72. In at least one method step 84, the computing capacity of the computing unit 14 of the swarm 16, 16' is extended by the computing capacity of a computing module 26 of an object 10. The extension of the computing capacity and the distribution of the calculation tasks to be managed by means of the computing capacity are dynamically controlled by the computing unit 14. In at least one method step 94, data and/or sensor data are transmitted by the objects 10 and/or the sensors 24, 30 and are received by the central communication module 52 of the communication unit 12. In at least one method step 90, the data received by the communication unit are decrypted by the encryption module 34 and/or data to be transmitted by means of the communication unit 12 are decrypted by the encryption module 34. In at least one method step 96, the plausibility of sensor data received by means of the communication unit 12 is checked by the plausibility module 28. In at least one method step 98, a sensor 24, 30 is recalibrated by the calibration module 76. In at least one method step 38, suitable sensors 24, 30 are determined by the discrimination module 54 for a calibration of a further sensor 24, 30. In at least one method step 86, an event is recognized by the event recognition module 32 on the basis of the data received by the communication unit 12. To do this, a pattern recognition is carried out by the event recognition module 32 on the basis of the received data. In at least one method step 48, commands are output to one of the objects 10 of the swarm 16, 16' and information is output to an operator 68 of one of the objects 10 of the swarm 16, 16' depending on the swarm information of the objects 10 of the swarm 16, 16'. In at least one method step 88, the commands of the computing unit 14 are modified and/or blocked by the energy-monitoring module 20 depending on the energy state of the swarm 16, 16' and/or the energy state of an object 10 of the swarm 16, 16' prior to an output by the computing unit 14. In at least one method step 92, commands are transmitted by means of the communication unit 12 to objects 10 and/or sensors 24, 30.

The invention claimed is:

1. A hand-held power tool management device, for monitoring and/or managing a plurality of objects, at least some of the plurality objects including sensors, the device comprising:
   a communication unit configured to communicate with the plurality of objects to receive electronic data, the electronic data including sensor data from the sensors of the plurality of objects; and
   a computing unit configured to process the electronic data received from the communication unit,
   wherein a swarm includes at least one of the objects in the plurality of objects, and
   wherein the computing unit is configured to (i) process the electronic data to determine swarm information of the swarm and (ii) depending on the swarm information of the swarm, output commands to at least one of the objects of the swarm,
   wherein the computing unit has an energy-monitoring module configured to modify and/or to block at least one of the commands depending on an energy state of the swarm and/or an energy state of at least one object of the swarm prior to an output by the computing unit.

2. The device as claimed in claim 1, wherein the computing unit has a swarm-forming module configured to assign objects to the swarm and/or to remove objects from the swarm based on the received electronic data including the swarm information.

3. The device as claimed in claim 1, wherein at least one of the commands output by the computing unit is configured to activate and/or block a single function of at least one of the objects.

4. The device as claimed in claim 1, wherein the computing unit has a swarm-checking module configured to check the swarm for completeness.

5. The device as claimed in claim 1, wherein:
the computing unit is configured to calibrate the sensors of the swarm and/or to output a calibration instruction to an operator of at least one object belonging to the swarm based on the swarm information.

6. The device as claimed in claim 1, wherein the computing unit is extended, at least in time segments, by at least one computing module which is assigned to at least one object of the swarm.

7. The device as claimed in claim 6, wherein a computing power distribution among the computing modules of the computing unit is controlled depending on the swarm information.

8. The device as claimed in claim 1, wherein the computing unit has at least one maintenance module configured to check at least one service state of at least one computing module of the swarm and/or at least one object of the swarm, and to initiate a maintenance step depending on the service state.

9. The device as claimed in claim 1, wherein:
a sensor activation and/or a sensor use is controlled depending on the swarm information.

10. The device as claimed in claim 1, wherein:
the computing unit has a plausibility module configured to determine a plausibility of sensor data of the sensors of the swarm using a control and/or readout of a suitable further sensor of the swarm depending on the swarm information.

11. The device as claimed in claim 1, wherein the computing unit comprises an event recognition module configured to recognize an event which relates to at least a part of the swarm based on the swarm information.

12. The device as claimed in claim 11, wherein the recognition of the event is based on a movement of at least a part of the swarm.

13. The device as claimed in claim 11, wherein the recognition of the event is based on a temperature at different locations within the swarm.

14. The device as claimed in claim 1, wherein the communication unit has an encryption module configured to encrypt and/or to decrypt a data communication within the swarm and/or with the computing unit.

15. A system comprising:
a swarm including a plurality of objects, at least some of the plurality of objects including sensors, the objects being hand-held power tools; and
a device for monitoring and/or managing the plurality of objects, the device including:
a communication unit configured to communicate with the plurality of objects to receive electronic data, the electronic data including sensor data from the sensors of the plurality objects, and
a computing unit configured to process the electronic data received from the communication unit, the computing unit being configured to (i) process the electronic data to determine swarm information of the swarm and (ii) depending on the swarm information of the swarm, output commands to at least one of the objects of the swarm,
wherein the computing unit has an energy-monitoring module configured to modify and/or to block at least one of the commands depending on an energy state of the swarm and/or an energy state of at least one object of the swarm prior to an output by the computing unit.

16. The system as claimed in claim 15, further comprising an access control unit.

17. The system as claimed in claim 16, wherein the access control unit is configured to enable and/or to block a function of at least a part of the swarm depending on an access authorization of the at least one operator wishing to gain access to at least a part of the swarm and/or depending on at least one swarm information element.

18. The system as claimed in claim 17, wherein the access control unit comprises at least one camera and/or at least one motion detector.

19. A method for monitoring and/or managing a plurality of objects which form a swarm using a device, at least some of the plurality objects including sensors, the method comprising:
receiving electronic data from the plurality of objects with a communication unit of the device, the electronic data including sensor data from the sensors of the plurality objects
generating, with a computing unit of the device, swarm information of the swarm by processing the electronic data received from the plurality of objects;
outputting commands to at least one of the objects of the swarm depending on the swarm information; and
modifying and/or blocking at least one of the commands depending on an energy state of the swarm and/or an energy state of at least one object of the swarm prior to an output by the computing unit,
wherein the plurality of objects that form the swarm is a plurality of hand-held power tools.

* * * * *